United States Patent [19]

Huang et al.

[11] Patent Number: 5,426,171
[45] Date of Patent: Jun. 20, 1995

[54] THERMOPLASTIC RESINS CONTAINING COATED ADDITIVES

[75] Inventors: Yi-Bin Huang; Bruce P. Thill, both of Midland, Mich.

[73] Assignee: The Dow Chemical Company, Midland, Mich.

[21] Appl. No.: 147,363

[22] Filed: Nov. 5, 1993

Related U.S. Application Data

[63] Continuation of Ser. No. 660,461, Feb. 26, 1991, abandoned.

[51] Int. Cl.⁶ ............................................. C08K 9/00
[52] U.S. Cl. ................................. 523/217; 524/493; 524/494
[58] Field of Search ................. 524/493, 494; 523/217

[56] References Cited

U.S. PATENT DOCUMENTS

| | | |
|---|---|---|
| 3,375,228 | 7/1968 | Holoch et al. . |
| 4,071,494 | 1/1978 | Gaylord et al. .................. 260/42.18 |
| 4,654,405 | 3/1987 | Jalbert et al. . |
| 4,771,096 | 9/1988 | Bussink et al. ...................... 524/508 |
| 4,946,897 | 8/1990 | Albizzati et al. .................... 525/132 |

FOREIGN PATENT DOCUMENTS 1-135868 2/1989 Japan .

*Primary Examiner*—Paul R. Michl
*Assistant Examiner*—Edward Cain

[57] ABSTRACT

A composition of matter comprising 25 to 99 parts by weight thermoplastic resin and 75 to 1 part by weight solid reinforcing agent having a surface coating of a polar group functionalized polyarylene ether.

8 Claims, No Drawings

THERMOPLASTIC RESINS CONTAINING COATED ADDITIVES

CROSS-REFERENCE TO RELATED APPLICATION

This is a continuation of application Ser. No. 07/660,461 filed Feb. 26, 1991, now abandoned.

BACKGROUND OF THE INVENTION

The present invention relates to thermoplastic resins containing additives that have been surface coated with a modifying agent. The surface coating permits improved compatibility between the additive and thermoplastic resin.

In Japanese Kokai 1-135868, published May 29, 1989, there are disclosed certain resin compositions containing (a) inorganic fillers and (b) polyphenylene ether type resins including maleic anhydride modified poly(2,6-dimethyl-1,4-phenylene)ether. The resins are useful for electrical parts.

According to the present invention there is provided a composition of matter comprising A) from 25 to 99 parts by weight of a thermoplastic resin and B) from 75 to 1 parts by weight of a glass, ceramic, polymeric or carbon reinforcing agent having a surface coating of a polar group functionalized polyarylene ether.

Polar group functionalized polyarylene ethers are a known class of compounds prepared by contacting polar group containing reactants with polyarylene ethers. The reaction is normally conducted at an elevated temperature preferably in a melt of the polyarylene ether under conditions to obtain homogeneous incorporation of the functionalizing reagent. Suitable temperatures are from 150° C. to 300° C. Polyarylene ethers are a known class of polymers having been previously described in U.S. Pat. Nos. 3,306,874, 3,306,875, 3,257,357, 3,257,358, and elsewhere. A preferred polyarylene ether is poly(2,6-dimethyl-1,4-phenylene)ether. The polyphenylene ethers are normally prepared by an oxidative coupling reaction of the corresponding bisphenol compound.

Suitable polar groups include the acid anhydrides, acid halides, acid amides, sulfones, oxazolines, epoxies, isocyanates, and amino groups. Preferred polar group containing reactants are compounds having up to 20 carbons containing reactive unsaturation, such as ethylenic or aliphatic ring unsaturation, along with the desired polar group functionality. Particularly preferred polar group containing reactants are dicarboxylic acid anhydrides, most preferably maleic anhydride. Typically the amount of polar group functionalizing reagent employed is from 0.01 percent to 20 percent, preferably from 0.5 to 15 percent, most preferably from 1 to 10 percent by weight based on the weight of polyarylene ether. The reaction may be conducted in the presence of a free radical generator such as an organic peroxide or hydroperoxide agent if desired. Preparation of polar group functionalized polyarylene ethers have been previously described in U.S. Pat. Nos. 3,375,228, 4,771,096 and 4,654,405 the teachings of which are herein incorporated in their entirety by reference thereto.

The general procedure for obtaining polar group functionalized polyarylene ethers is to contact a reagent containing both ethylenic unsaturation and the desired polar group previously specified. Generally if less than 0.01 weight percent of the polar group containing reactant is employed, less than desired compatibility between the reinforcing agent and the thermoplastic resin is attained.

The glass, ceramic, polymeric or carbon reinforcing agent may be in the shape of fibers having a length to diameter ratio (L/D) of greater than 5 or in the shape of particulates having (L/D) less than 5. Preferred particle diameters are from 0.1 micrometers to 1 millimeter. Suitable reinforcing agents include glass microspheres, glass fibers, ceramic whiskers, carbon fiber strands, boron nitride fibers, aramide fibers, etc. Preferred are glass fibers, glass roving or chopped glass fibers having lengths from 0.1 to 10 millimeters and L/D from 5 to 100. One such suitable glass fiber is available from Owens Corning Fiberglass under the designation OCF 414 TM.

The reinforcing agent may include a sizing agent or similar coating which among other functions, may promote adhesion between the reinforcing agent and the polar group functionalized polyarylene ethers. Suitable sizing agents may contain amine, aminosilane, and aminophosphine functional coupling agents. Preferred are aminosilane coupling agents such as 3-aminopropyltrimethoxysilane.

Thermoplastic resins suitably utilized in the present invention include homopolymers and copolymers of vinylaromatic monomers, particularly homopolymers and copolymers of styrene. Suitable comonomers include acrylnitrile, methyl methacrylate, N-phenylmaleimide, etc. Preferred are copolymers containing from 5 to 50 percent by weight of one or more such comonomers. Also included are rubber modified homopolymers and copolymers of vinylaromatic monomers such as high impact polystyrene-containing butadiene or styrene butadiene based elastomers; specifically high impact polystyrene and ABS resins. Additional vinylaromatic polymers are those having a stereoregular structure that is highly syndiotactic. Additional suitable thermoplastic resins include polycarbonates, polyamides, polyvinylchloride, polyesters, polyimides, and polyarylene ethers. In addition, mixtures of all of the foregoing thermoplastic resins may additionally be employed.

A most preferred thermoplastic resin is syndiotactic polystyrene prepared by coordination polymerization of styrene monomer under conditions to provide a high degree of syndiotacticity. Preferred are those polymers containing greater than 50 percent syndiotacticity at a racemic triad. Such polymers are known in the art having been previously disclosed in U.S. Pat. Nos. 4,680,353, 4,959,435, 4,950,724, 4,774,301, and elsewhere. The teachings of the foregoing U.S. patents are incorporated herein in their entirety by reference thereto.

The compositions of the present invention are prepared by combining the respective components under conditions to provide uniform dispersal of the reinforcing agent. The surface coating is suitably applied to the reinforcing agent by contacting the same with a solution of the polar group functionalized polyarylene ether. Suitable solvents for dissolving the polar group functionalized polyarylene ether include methylene chloride, trichloromethane, trichloroethylene, trichloroethane, etc. Preferably the concentration of polar group functionalized polyarylene ether in the solution is from 0.1 weight percent to 20 weight percent, preferably 0.5 to 2 percent by weight. After coating of the reinforcing agent the solution is removed such as by evaporation, devolatilization, vacuum drying, etc.

The resulting surface coating is desirably from 0.001 to 10 weight percent of the uncoated reinforcing agent weight. Homogeneous incorporation of the thermoplastic resin and coated reinforcing agent is obtained by mechanical mixing devices such as extruders, ribbon blenders, solution blending or any other suitable technique. Preferred compositions are those containing from 5 to 95 parts thermoplastic resin and 49 to 5 parts reinforcing agent.

Additional additives such as fillers, elastomers, blowing agents, extrusion aids, antioxidants, pigments, plasticizers, stabilizers, lubricants, etc. may also be included in the composition in amounts up to 50 percent, preferably up to 25 percent by weight.

Having described the invention the following example is provided as further illustrative and is not to be construed as limiting. Unless states to the contrary parts and percentages are based on weight.

EXAMPLE 1

A maleic anhydride modified polyphenylene oxide resin containing 3 weight percent maleic anhydride (MAPPO) is prepared by injecting maleic anhydride at an appropriate rate to provide the desired maleic anhydride content into a 0.8" (2.0 cm) Welding Engineers Twin Screw extruder which is charged with poly(2,6-dimethyl-1,4-phenylene)ether and operated under conditions to melt plastify the resin. The resulting product is extruded and chopped into granules. A 1 weight percent solution of the resulting MAPPO in trichloroethylene solvent was prepared. Glass fibers (Owens Corning Fiberglas 414 TM fiber, desized by treatment with methylene chloride) are contacted with the solution in the following manner. Individual fibers are glued to aluminum tabs using epoxy resin on one end of the fiber. The free fiber end is then dipped into the solution for approximately 1 second, removed and dried in a vacuum oven overnight at approximately 50° C. A molten droplet of the desired thermoplastic resin is picked up on the end of a single fiber applicator and is then transferred, while still molten, to the heated test fiber, by drawing the applicator fiber across the test fiber. Individual adhesive strength measurements on the fibers are then used to quantify the degree of the adhesive strength attained between the resin and the fiber. This technique is referred to as the microbond pullout technique and is disclosed in B. Miller, et al., "A Microbond Method for Determination of the Shear Strength of a Fiber/Resin Interface", Composites Science and Technology, 28, 17–32 (1987).

Comparative runs are performed on individual fibers that are not treated with the maleic anhydride modified polyarylene ether. The identities of the various thermoplastic resins tested and the results of the testing are contained in Table 1. Results are the average of 15 individual fiber tests.

TABLE 1

| Surface Coating | Thermoplastic Resin | Interfacial Sheer Strength psi (kPa × $10^3$) |
| --- | --- | --- |
| — | SPS[1] | 1700 (12) |
| MAPPO | SPS | 2300 (16) |
| — | SPS/MAPPO[2] | 3500 (24) |
| MAPPO | SPS/MAPPO | 5000 (34) |

[1]Syndiotactic polystyrene, Mw 360,000, >95% syndiotactic
[2]Blend of SPS and MAPPO, 2.5 weight percent MAPPO The above results indicate that improved compatibility between the reinforcing agent and thermoplastic resin is attained by use of the surface coated reinforcing agent of the present invention. This result indicates that resinous blends incorporating the coated reinforcing agents would possess improved compatibility and accordingly improved strength properties, such as tensile and flexural strength.

What is claimed is:

1. A composition of matter comprising:
   A. from 25 to 99 parts by weight of a thermoplastic resin selected from the group consisting of syndiotactic polystyrene and mixtures of syndiotactic polystyrene and a polyarylene ether, and
   B. from 75 to 1 parts by weight of a fibrous, glass, ceramic, polymeric or carbon reinforcing agent having a length/diameter ratio greater than 5, a sizing composition comprising an aminosilane coupling agent, and a surface coating of a polar group functionalized polyarylene ether.

2. A composition according to claim 1 wherein the reinforcing agent comprises glass fibers.

3. A composition according to claim 1 wherein the sizing composition comprises a 3-aminopropyltrimethoxysilane.

4. A composition according to claim 1 wherein the polar group functionalized polyarylene ether is a dicarboxylic acid anhydride modified polyarylene ether.

5. A composition according to claim 4 wherein the dicarboxylic acid anhydride modified polyarylene ether is a maleic anhydride modified polyarylene ether.

6. A composition according to claim 5 wherein the maleic anhydride modified polyarylene ether is produced by melt blending a polyarylene ether, from 0.5 to 15 weight percent maleic anhydride and optionally an organic peroxide under conditions to produce reaction there between.

7. A composition according to claim 1 prepared by coating the reinforcing agent with a solution of the polar group functionalized polyarylene ether in a solvent and thereafter removing the solvent.

8. A composition according to claim 1 wherein the polyarylene ether is poly(2,6-dimethyl-1,4-phenylene)ether.

* * * * *

UNITED STATES PATENT AND TRADEMARK OFFICE
CERTIFICATE OF CORRECTION

PATENT NO. : 5426171
DATED : June 20, 1995
INVENTOR(S) : Yi-Bin Huang; Bruce P. Thill It is certified that error appears in the above-identified patent and that said Letters Patent is hereby corrected as shown below:

On the cover page, Item: #[73], following Mich. Insert -- Idemitsu Kosan Co. Ltd., Tokyo, Japan --

Signed and Sealed this

Ninth Day of December, 1997

Attest:

BRUCE LEHMAN

Attesting Officer

Commissioner of Patents and Trademarks